United States Patent [19]

Van Rens

[11] 4,229,151

[45] Oct. 21, 1980

[54] SIDE PORT - RC ENGINE

[75] Inventor: Russell J. Van Rens, Waukesha, Wis.

[73] Assignee: Outboard Marine Corporation, Waukegan, Ill.

[21] Appl. No.: 586,266

[22] Filed: Jun. 12, 1975

[51] Int. Cl.$^3$ .......................... F01C 1/02; F01C 21/12
[52] U.S. Cl. ................................................. 418/61 A
[58] Field of Search ................. 418/61 A; 123/8.01, 123/8.45, 242

[56] References Cited

U.S. PATENT DOCUMENTS

| | | | |
|---|---|---|---|
| 2,947,290 | 8/1960 | Froede et al. | 418/61 A |
| 2,988,065 | 6/1961 | Wankel et al. | 418/61 A |
| 3,097,632 | 7/1963 | Froede | 418/61 A |
| 3,234,922 | 2/1966 | Froede | 418/61 A |
| 3,514,235 | 5/1970 | Yamauchi | 418/61 A |
| 3,779,214 | 12/1973 | Ward | 123/8.01 |

FOREIGN PATENT DOCUMENTS 1151978  7/1963  Fed. Rep. of Germany .......... 123/8.45

OTHER PUBLICATIONS

Ansdale, R. F., *The Wankel RC Engine*, London ILIFFE Books Limited, 1968, pp. 84–94.

*Primary Examiner*—John J. Vrablik

*Attorney, Agent, or Firm*—Michael, Best & Friedrich

[57] ABSTRACT

Disclosed herein is a rotary internal combustion engine comprising a generally trochoid shaped housing including a pair of spaced generally parallel side walls, a generally triangularly shaped rotor supported within the housing for rotation about an axis perpendicular to the side walls, which rotor includes three generally identically shaped side flanks which define, in cooperation with the housing, respective chambers which rotate with the flanks and which vary in volume in accordance with such rotation. The side flanks each include an end which leads in relation to the direction of rotor rotation, an end which trails in relation to the direction of rotor rotation, and a length extending between the leading and trailing ends. In addition, one of the side walls includes a charge inlet port which selectively communicates with the chambers in response to rotor rotation, which extends arcuately relative to the rotor axis, and which includes a portion which terminally communicates with the chambers and which is located such that the portion is closed off from communication with the chambers by respective parts of the flanks, which parts are spaced from the trailing ends in the direction toward the leading ends at a distance of from about 35 to 70 percent of the flank length.

1 Claim, 2 Drawing Figures

SIDE PORT - RC ENGINE

BACKGROUND OF THE INVENTION

The invention relates generally to rotary internal combustion engines and more particularly, to side inlet ports for such engines.

A typical prior art side inlet port arrangement 11 for a rotary internal combustion engine is shown in FIG. 1. More specifically, FIG. 1 schematically illustrates a rotary internal combustion engine 13 including a trochoid shaped housing 15 defined by two spaced and generally parallel walls 17 (only one shown), and a rotor 21 which is located within the housing 15, which is generally triangular in shape, and which includes three identically constructed side flanks 23 which, in cooperation with the housing, define respective chambers 25 which rotate with the flanks 23 and which vary in volume in response to such rotation.

One of the side walls 17 includes a side inlet port 31 arranged such that the port portion 33 which terminally communicates with the chambers 25 is located so as to be closed by parts 41 of the rotor flanks 23 which are located generally adjacent to the trailing end of such flanks. Accordingly, the last increment of fuel entering into the rotating chambers 25 is located generally in the corners of such chambers with the result that poor running conditions can occur at idle speeds.

As shown, the parts 41 which close off the terminal portions 33 are located at a distance A from the trailing end of the flank, which distance A is about 12½ percent of the flank length between the leading and trailing flank edges.

SUMMARY OF THE INVENTION

The invention provides a rotary internal combustion engine comprising a generally trochoid shaped housing including a pair of spaced generally parallel side walls, a generally triangularly shaped rotor supported within the housing for rotation about an axis perpendicular to the side walls, which rotor includes three generally identically shaped side flanks which define, in cooperation with the housing, respective chambers which rotate with the flanks and which vary in volume in accordance with such rotation. The side flanks each include an end which leads in relation to the direction of rotor rotation, an end which trails in relation to the direction of rotor rotation, and a length extending between the leading and trailing ends. In addition, one of the side walls includes a charge inlet port which selectively communicates with the chambers in response to rotor rotation, which extends arcuately relative to the rotor axis, and which includes a portion which terminally communicates with the chambers and which is located such that the portion is closed off from communication with the chambers by respective parts of the flanks, which parts are spaced from the trailing ends in the direction toward the leading ends at a distance of from about 35 to 70 percent of the flank length.

One of the principal features of the invention is the provision of a rotary internal combustion engine which includes a side inlet port and which has good running characteristics at idle speeds.

Another of the principal features of the invention is the provision of a rotary internal combustion engine including a side inlet port which is operative, just prior to closure of the port, to deliver incoming charge to a portion of the combustion chamber extending along a center part of the flank of the rotor so as to improve idle running conditions by avoiding terminal supply of fuel to a corner or end part of the combustion chamber and the consequent stratification which results therefrom and which otherwise results in relatively poor idling conditions.

Other features and advantages of the embodiments of the invention will become known by reference to the following general description, appended claims, and drawings.

THE DRAWINGS

Figure 1:
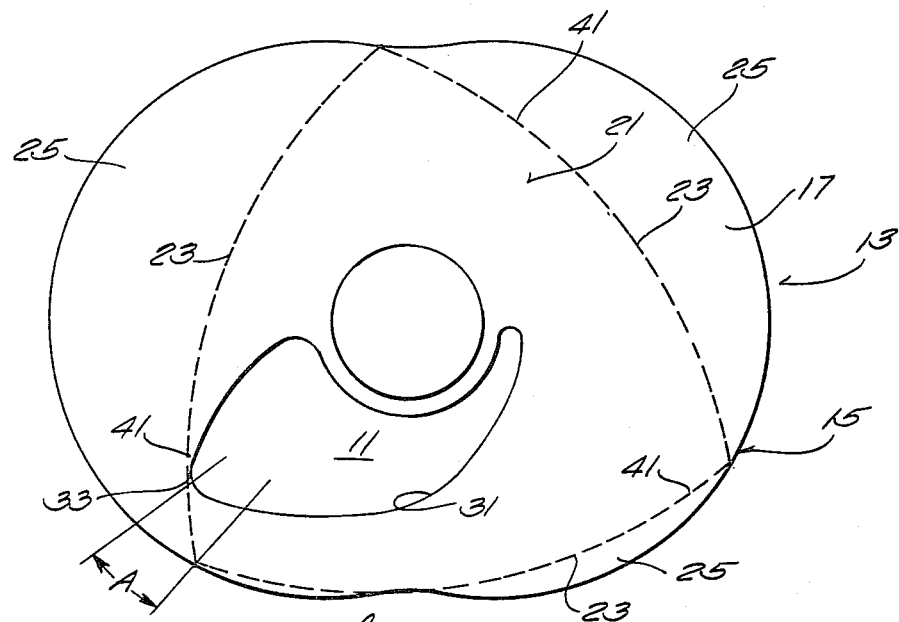
FIG. 1 is a schematic view of a prior rotary internal combustion engine.

Before explaining the embodiments of the invention in detail, it is to be understood that the invention is not limited to its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Figure 2:
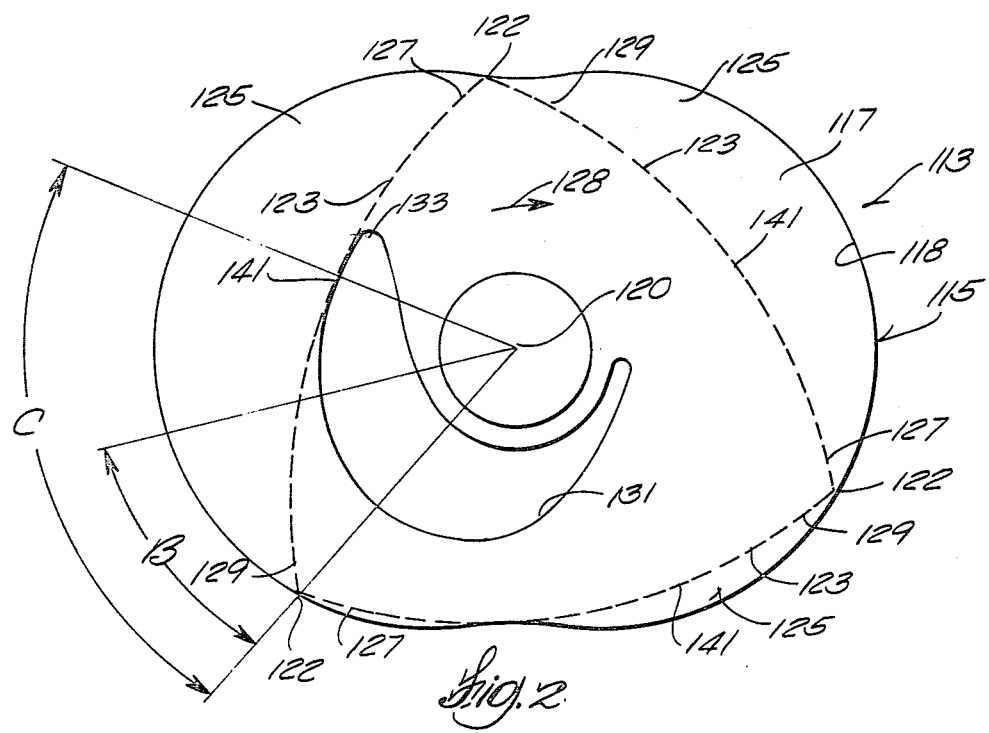
FIG. 2 is a schematic view of a rotary internal combustion engine embodying various of the features of the invention.

Shown in FIG. 2 of the drawings is a rotary internal combustion engine 113 which includes a generally trochoid shaped housing 115 including a pair of spaced generally parallel side walls 117, only one of which is shown. The housing 115 also includes an outer wall 118 extending generally perpendicularly between the side walls 117. Located within the housing 115 is a generally triangularly shaped rotor 121 which is supported for rotation about an axis 120 perpendicular to the side walls 117 and parallel to the outer wall 118.

The rotor 121 includes three apices 122 and three generally identically shaped side flanks 123 which extend between the apices 122 and which define, in cooperation with the housng 115, respective chambers 125 which rotate with the side flanks 123 and which vary in volume in accordance with such rotation. Each of the side flanks 123 includes an end 127 which leads in relation to the direction of rotor rotation (indicated by the arrow 128), an end 129 which trails in relation to the direction of rotor rotation, and a length extending between the leading and trailing ends 127 and 129.

Located in one of the side walls 117 is a charge inlet port 131 which selectively communicates with the chambers 125 in response to rotor rotation. The side inlet port 131 extends arcuately relative to the rotor axis 120 and includes a portion 133 which terminally communicates with the chambers 125 and which is located such that the portion 133 is closed off from communication with the chambers 125 by respective central parts 141 of the flanks 123, which parts 141 are spaced from the trailing ends 129 in the direction toward the leading ends 127 at a distance of from about 35 to 70 percent of the flank length. Thus, the major portion of charge or fuel delivered through the inlet port 131 into the communicating chamber 125 is supplied along the central part 141 of the associated flank 123 and not toward the flank trailing end and into a corner of the chamber 125. Such supply of the fuel along the central part 141 of one side of the chamber 125 permits relatively even idling operation as compared to the past when employing side inlet ports 31 arranged as shown in FIG. 1.

As shown in FIG. 2, the distance B represents 25 percent of the flank length and the distance C represents 50 percent of the flank length. Thus, the parts 141 are located generally in a range spaced from the adjacent trailing end 129 at a distance of between 35 percent and 70 percent of the flank length. It is believed that locating the port 131 so that the part 141 is located toward the 70 percent end of the range will increase the smoothness of performance.

Various of the features of the invention are set forth in the following claims.

I claim:

1. A rotary internal combustion engine comprising a generally trochoid shaped housing including a pair of spaced generally parallel side walls, a generally triangularly shaped rotor supported within said housing for rotation about an axis perpendicular to said side walls, said rotor including three generally identically shaped side flanks which define, in cooperation with said housing, respective chambers which rotate with said flanks and which vary in volume in accordance with such rotation, each of said flanks having an end which leads in relation to the direction of rotor rotation, and end which trails in relation to the direction of rotor rotation and a length extending between said leading and trailing ends, and a charge inlet port which is located in one of said side walls, which selectively communicates with said chambers in response to rotor rotation whereby to open and close said port, which extends arcuately relative to said rotor axis, and which includes a portion which, after opening of said part, terminally communicates with said chambers and which is located such that said portion is closed off from communication with said chambers by respective parts of said flanks, which parts are spaced from said trailing ends in the direction toward said leading ends at a distance of from about 35 to 70 percent of said flank length.

* * * * *